US006698903B2

(12) United States Patent
Hall

(10) Patent No.: US 6,698,903 B2
(45) Date of Patent: Mar. 2, 2004

(54) REFLECTIVE SAFETY GARMENT

(76) Inventor: Eugene C. Hall, 2750 Old St. Augustine Rd. #V222, Tallahassee, FL (US) 32301

(*) Notice: Subject to any disclaimer, the term of this patent is extended or adjusted under 35 U.S.C. 154(b) by 0 days.

(21) Appl. No.: 09/770,476

(22) Filed: Jan. 29, 2001

(65) Prior Publication Data

US 2002/0145805 A1 Oct. 10, 2002

(51) Int. Cl.[7] .................................................. G02B 5/12

(52) U.S. Cl. ........................ 359/516; 359/519; 362/108; 2/102

(58) Field of Search ...................... 359/15–19; 362/103, 362/108; 2/461, 462, 46, 913, 102, 84

(56) References Cited

U.S. PATENT DOCUMENTS

| | | | | |
|---|---|---|---|---|
| 4,328,533 A | * | 5/1982 | Paredes | 359/519 |
| 5,070,436 A | | 12/1991 | Alexander et al. | 362/108 |

* cited by examiner

*Primary Examiner*—James Phan

(57) ABSTRACT

A safety garment including a vest configuration having a front panel and a rear panel is disclosed. Centrally located on said rear panel is a reflective patch. Surrounding the patch is a mesh material having elastic properties. Extending outwardly from the sides of the vest are protrusions fabricated from a rigid material. Located on these protrusions are reflective patches. A hood can be removably secured to the vest.

19 Claims, 4 Drawing Sheets

REFLECTIVE SAFETY GARMENT

BACKGROUND OF THE INVENTION

1. Field of the Invention

The present invention relates generally to reflective safety garment and more particularly to a reflective safety garment designed and configured to be worn over existing article of clothing so as to offer exceptional viewing capabilities of the wearer during dark or inclement weather, ultimately providing visibility of the wearer to others for inherently offering safety to the user.

2. Description of the Prior Art

It is well known that pedestrians, construction workers, and the like are hit by a motor vehicle injuring or possibly killing the individual. This devastating occurrence can possibly be avoided if the individual were to take precautionary measures, such as wearing a garment that would offer visibility of the wearer during dark or inclement weather. This will provide an apparatus that will offer safety to the user and inherently reduce injury and/or death generally associated with those who are outdoors and are in the vicinity of motor vehicles or the like.

As such, devices have been developed to address this need. For example, one such device is disclosed in U.S. Pat. No. 5,070,436 issued to Alexander et al. This patent discloses a device for protecting people by offering visibility during dark or inclement weather. This apparatus comprises a vest fabricated from colored, reflective material as well as providing a means for the device to be lighted.

In addition, reflective vests are also known in the art and are commonly used on construction sites. These vests are standard in size and are commonly fabricated from an orange reflective material.

Though the vests identified above do offer protection to the wearer, they are silent as to the use of a vest ideally suited for students, professionals, couriers, or those who utilize back packs or the like. What is needed is a device that not only offers protection, but one that can be easily placed over a user regardless of their size, shape and items they may have on their person. This device should be storable, adjustable, and easy to put on so as to offer a device that can be successfully utilized by any individual regardless of their age, dexterity and mental magnitude.

As will be seen, previous efforts do not provide the benefits intended with the present invention, such as providing a device that can be adjusted and one that can be worn by any individual, regardless of size and other items being worn by the user. Additionally, prior techniques do not suggest the present inventive combination of component elements as disclosed and claimed herein, as identified above. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a vest device designed and configured to offer visibility to the wearer when exposed to dark or inclement weather. This vest device is designed to be adjustable and can easily fit on a user and over items the user may be carrying and/or wearing, such as a backpack or the like.

In order to accomplish this, the reflective garment device of the present invention comprises a front panel coupled to a rear panel via adjustable side straps. This will provide for the reflective garment to include a front, back and adjustable side straps when worn.

Each section includes at least one reflective strap and/or element secured thereto, so as to provide for the device to illuminate when dark or when the user is in inclement weather. The rear or back panel includes a flexible mesh material centrally secured thereon. Secured to this flexible mesh material is a panel fabricated from conventional reflective material. In this design, should the user be wearing a backpack, then the mesh material can extend for accommodating the backpack, while the panel offers reflective capabilities. When a backpack or the like is not worn, then the material would return to its normal and not extended position.

Additional elements or features can be added to enhancing the final product. The garment device of the present invention can include side wings secured to the front and back panels so as to innately increase the surface area of the front and rear section so additional reflective material can be located thereon. This will offer more visibility of the present invention when worn. In addition, compartments and the like can be provided so as to offer storage capability of the vest when worn.

Accordingly, it is the object of the present invention to provide a safety garment, which will overcome the deficiencies, shortcomings, and drawbacks of the prior art and methods thereof.

Another object of the present invention is to provide for a safety garment having the capability of adjusting in size and including the capability of accepting and accommodating items in tow, such as back packs and the like, without being bulky when not in use and in a storable position.

A further object of the present invention, to be specifically enumerated herein, is to provide a safety product in accordance with the preceding objects and one which will conform to conventional forms of manufacture, be of simple design and easy to use so as to provide a product that would be economically feasible, long lasting and relatively trouble free.

Although there have been many inventions related to a reflective article, none of the inventions address the need for accommodating a back pack or the like, so as to allow for a device that can fit over any wearer, such as students, couriers, professional, hikers or the like. The present invention is sufficiently compact, low cost, and reliable enough to become commonly used. The present invention meets the requirements of the simplified design, compact size, low initial cost, low manufacturing cost, ease of wear and maintenance.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
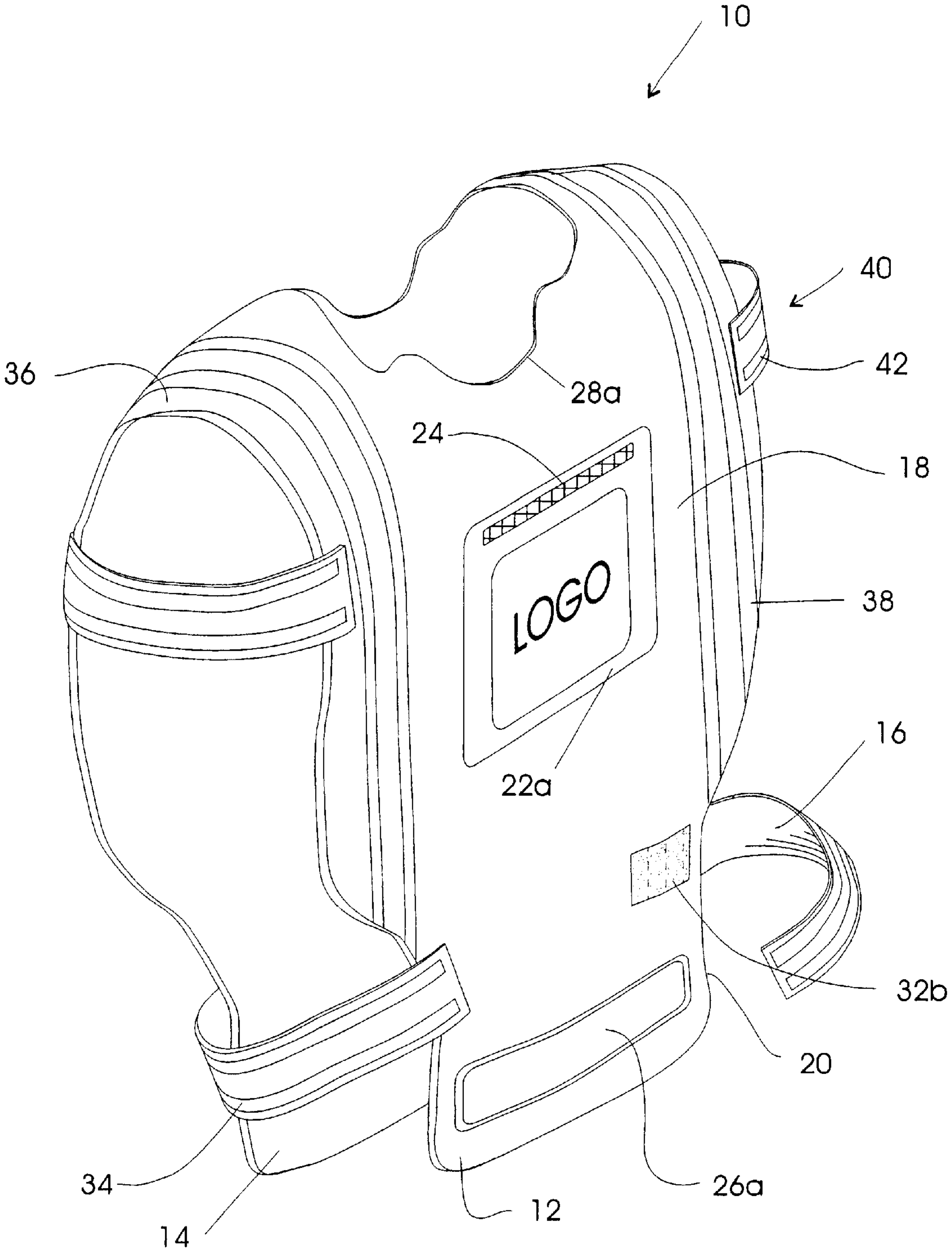
FIG. 1 is a perspective view of the safety garment of the present invention.
Figure 2:
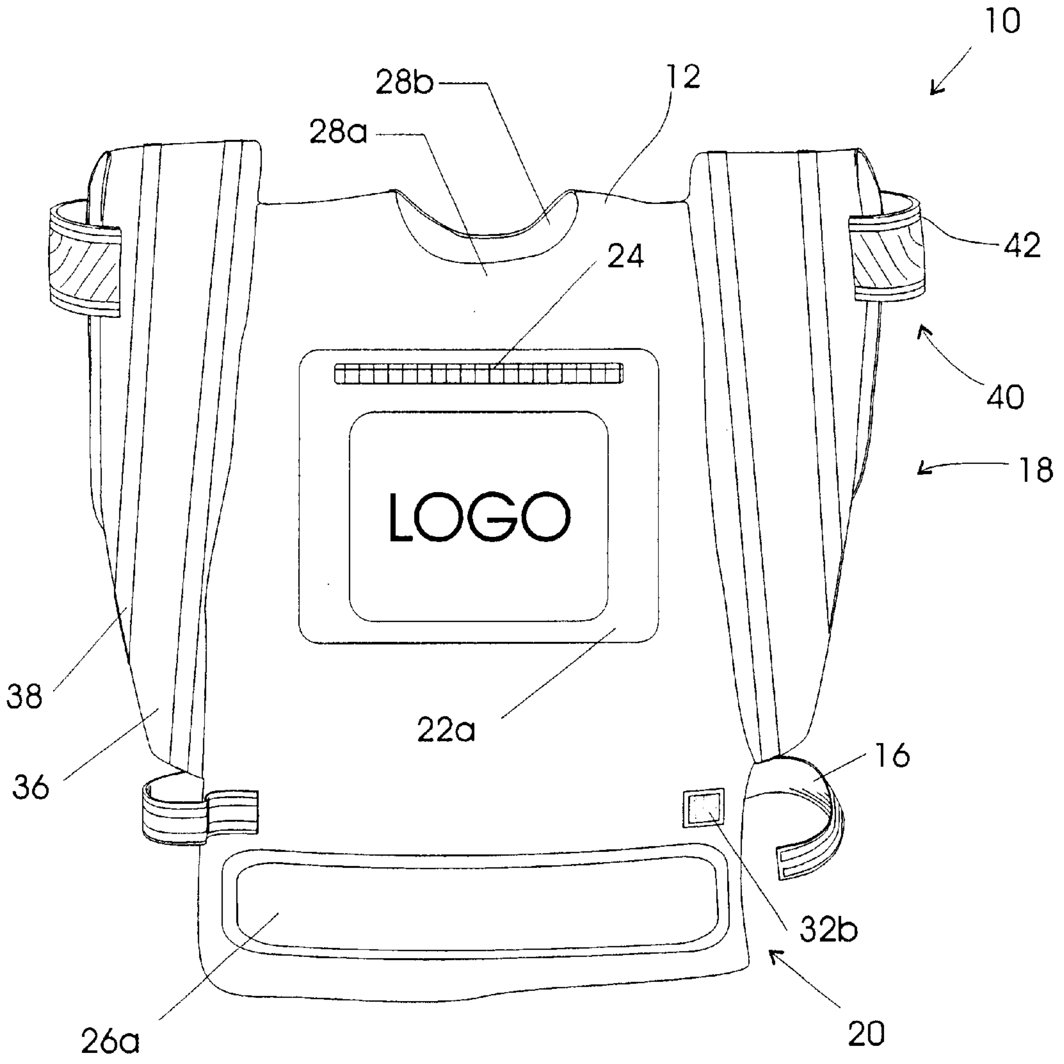
FIG. 2 is a front planar view of the safety garment of the present invention.
Figure 3:
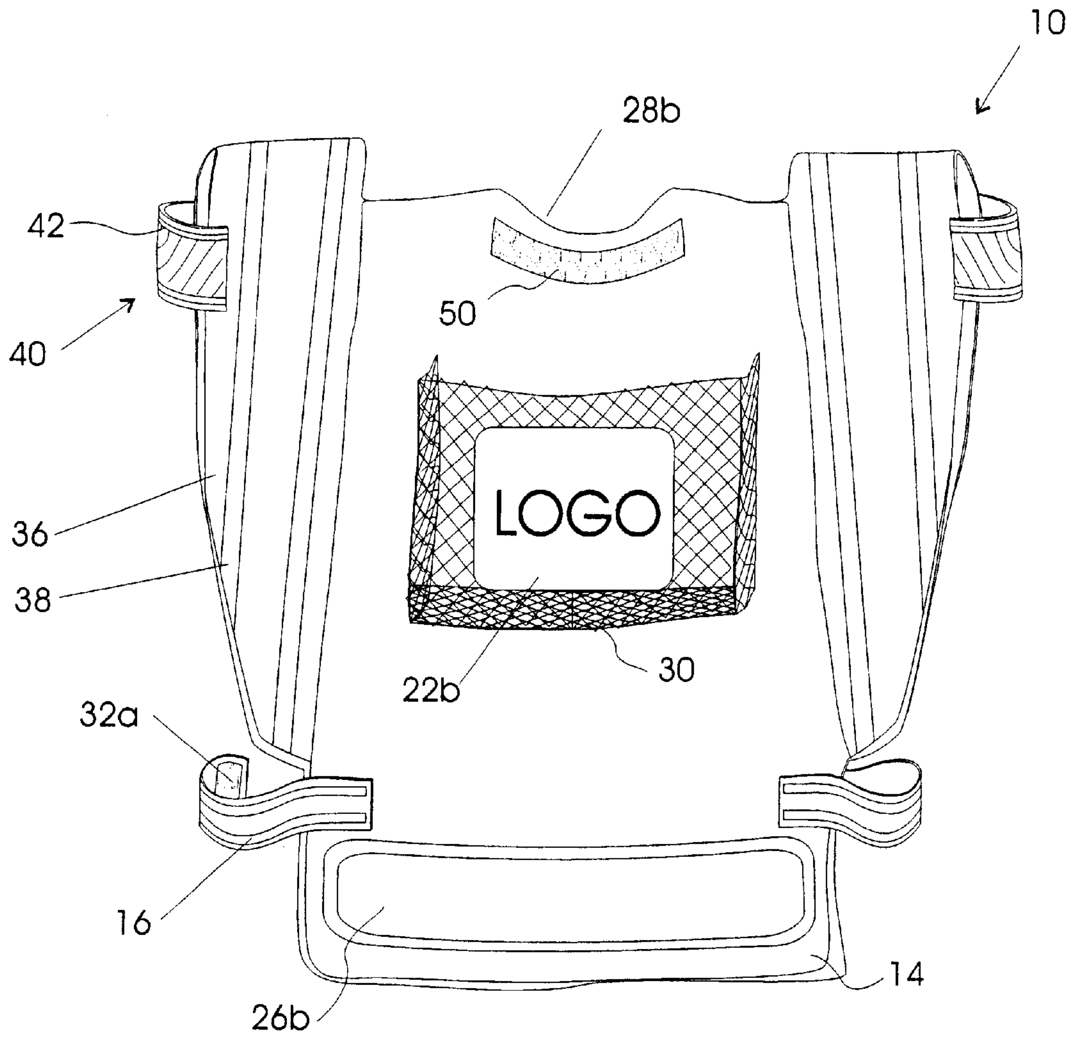
FIG. 3 is a back planar view of the safety garment of the present invention.

With reference to the drawings, in particular to FIGS. 1–3, there is shown a safety garment of the present invention, denoted by reference numeral 10. As seen, this garment is designed and configured to be worn by a user, over existing articles of clothing, so as to provide for a garment that has a structure of a vest. The design and structure of the safety garment of the present invention is to provide for an article that renders front, rear and side reflective viewing so as to offer adequate and efficient safety for the wearer. This will provide for the wearer to be visible from any angle or viewpoint.

As seen in the drawings, the safety garment or vest 10 comprises a front panel 12 (FIGS. 1 and 3) coupled to a rear panel 14 (FIGS. 1 and 3) via adjustable straps 16 (FIGS. 1–3). Each panel is fabricated from conventional material. Preferably, the material that forms the front and side panels is reflective. Combined, the front panel, rear panel and side straps provide for a wearable safety vest 10.

If the front panel is not made from reflective material, then at least one reflective patch 22*a* is located centrally thereon. This patch can be any shape, size or dimension and can further include any design, shape, logo or the like. If a logo, design or the like is located on the patch 22*a,* then this logo, design or the like can also be fabricated from reflective material.

The patch 22*a*, as seen in FIGS. 1 and 2, can act as a pocket and thus will include a conventional closure unit 24, such as a zipper, Velcro, buttons, or the like, to consequently provide for the pocket to be located thereon. The use of a pocket offers the user storage capability when worn. A flap can be located over the closure unit so as to provide for a more aesthetically pleasing product. It is noted that this first patch preferably be substantially large so as to provide for a patch that will substantially cover the user's chest.

A second patch 26*a* can be located on a lower portion of the front panel 12. This second patch is fabricated from at least one type and one color of reflective material so as to offer more visibility of the user. Preferably, and as illustrated, the reflective patch will include at least two different colors so as to ultimately provide a patch having a trim of one color and one type of reflectiveness and an inner section that is of a different color and of a different reflectiveness. Preferably this patch should be elongated in structure. Located along the top edge of the portion 18 is a groove 28*a,* which defines the front neckline of the wearer.

As seen in FIGS. 1 and 3, the rear panel includes an upper section and a lower portion. A reflective patch 22*b* is located centrally thereon. This patch can include any shape, design, shape, logo or the like.

Surrounding the patch is a conventional stretchable mesh material 30. This mesh material 30 is conventional and includes the capability of stretching when necessary and returning to its original shape when not extended. Thereby providing for the reflective patch 22*b* to be secured to the rear panel via the stretchable mesh material 30.

The use of mesh material will provide for a vest that will easily accommodate an article worn by the user, such as a backpack. Thus, rendering a vest that is ideally suited for students, couriers, bikers, hikers, or the like.

A second patch 26*b* can be located on the lower portion 20*b* of the rear panel 14. This second patch is fabricated from at least one type and one color of reflective material so as to offer more visibility to the user. Preferably, and as illustrated, the reflective patch will include at least two different colors so as to ultimately provide a patch being one color and one type of reflectiveness and a trim surrounding this patch that is of a different color and of a different reflectiveness. Preferably this patch should be elongated in structure.

Located along the top edge of the back of the rear panel 14 is a groove 28*b*. This groove defines the rear neckline of the wearer. The front groove 28*a* and rear groove 28*b*, combined form the opening that will receive the head and neck of the wearer. Thereby providing for the front and rear panels to be coupled to each other, as seen via the top end of the vest as shown in FIG. 1. This will provide for the sides to be open and not attached to each other. Such a design will provide for a vest to fit any person regardless of size and will also offer an easy, efficient and quick means of placing the safety garment over the user's head.

For adequately securing the front panel to the rear panel, via the side, the adjustable straps 16 are utilized. As seen in FIGS. 1–3, a strap is located on each side to provide for each strap to be secured to a side of the lower portion 20*b* of the rear panel 14. Secured in proximity to the outer ends of each strap is an attaching device 32*a*. Located on the front panel in the lower portion thereof is a cooperating attaching device 32*b*. Thus, providing for the attaching device 32*a* of the strap to be removably secured to the attaching device 32*b* located on the front panel. This will innately provide for the straps to be removal by secured to the front of the vest. It is preferred that the attaching device utilized in the present invention be hook and loop material, commonly known as VELCRO. In a preferred embodiment, the hook and loop material will be located substantially along the entire length of the lower surface of the strap. This will provide for the strap to be adjustable and thus enable for a more proper fit to the user. Secured exteriorly to each strap, visible to the wearer, is at least one patch 34. Each patch is fabricated from reflective material.

To enhance the safety garment 10 of the present invention, wings 36, as seen in FIGS. 1–3, can be located on the sides of the front and rear panel. Located on the wings is at least one patch 38 that is fabricated from reflective material. These wings, as seen in the figures, are continuous from the front and rear panel and inherently increase the visibility surface area, thereby increasing the safety value of the garment. The wings can be fabricated for a rigid material, such as plastic, so as to guarantee the wings remain in a constant position for adequate viewing.

For ensuring viewing from all sides, side arm straps 40 can be provided. As seen, the side arm straps 40 are located in the area of the upper portion and extend from the front to the rear of the vests. Secured to each strap is at least one patch 42 that is fabricated from a reflective material.

To increase visibility and to offer protection to the wearer during cold or inclement weather a hood can be secured to the rear groove of the rear panel. This attachment can be permanent or optionally, and as illustrated, can be removable.

Figure 4:
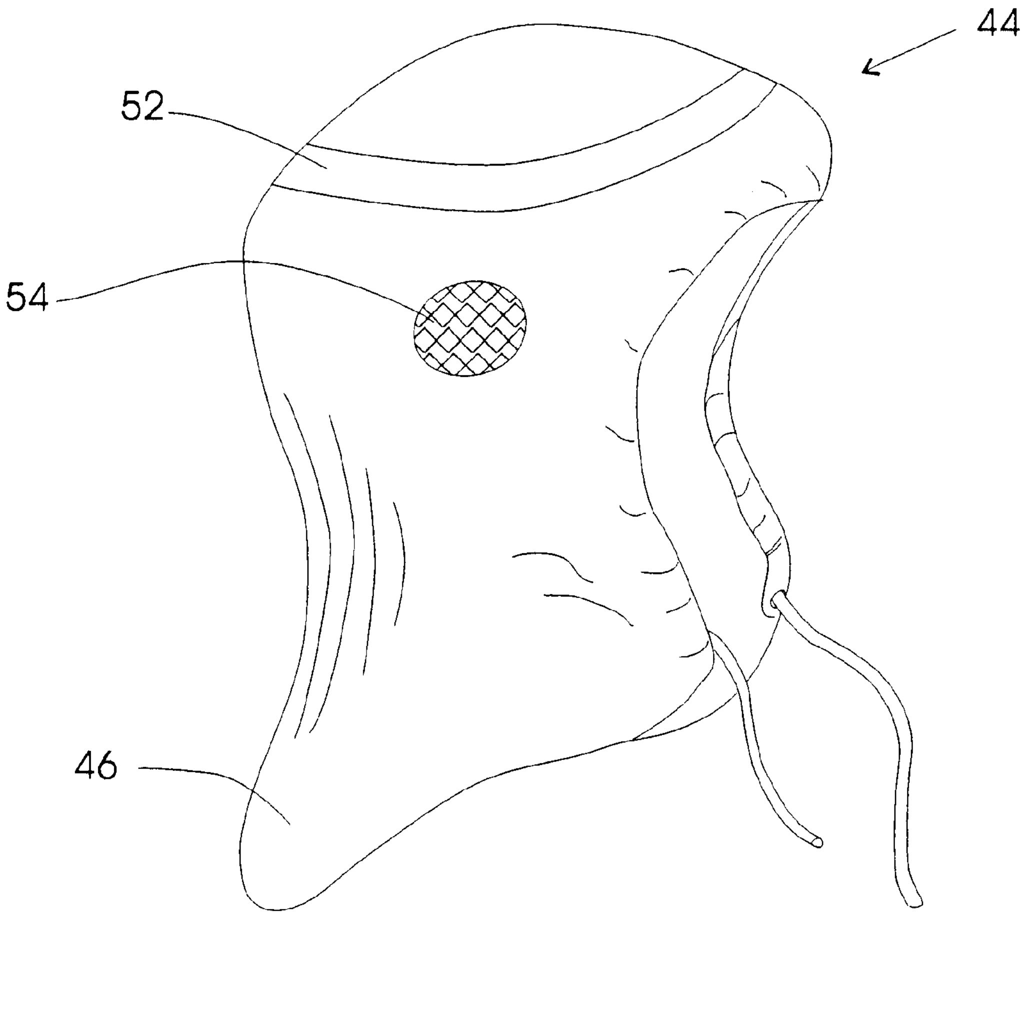
FIG. 4 is a perspective view of a hood attachment that can be used with the safety garment of the present invention.

An example of a hood that can be utilized with the present invention is shown in FIG. 4. As seen, the hood 44 includes a lower portion 46 and an upper portion thereof. The lower portion 46 will be secured to the second or rear groove 28*b*. This attachment can be permanent or optionally, removably. If removable, then secured to the exterior of rear panel 14 is an attaching device 50. Secured to the lower portion 46 of the hood is a cooperating attaching device. The attaching device can be any conventional attaching elements, such as, but not limited to hook and loop material (VELCRO), zippers, buttons, or the like. In the embodiment shown, the attaching device is VELCRO.

Enhancing hood, at least one reflective patch 52 can be secured circumfercially around the upper portion of the hood. Optionally, opening or vents 54 can be located in proximity to the ear area of the hood. The openings or vents 54 will not hinder the hearing of the user.

In order to utilize the present invention, the user places the opening formed by the first and second groove over his head. The straps are then taken from the back to the front and secured via conventional means.

It is noted that the patches as defined above can include any shape, design, or multiple layers so as to increase visibility and aesthetics of the final product.

Materials that have been used to produce favorable results for the patches, include, but are not limited to: 3M SCOTCHLITE reflective vest trim number 8471 Fluorescent Lime-Yellow with/Silver Reflective Stripe (500 Candelas/Lux/Square Metre Typical) for nighttime visibility, and number 8472 Fluorescent Red-Orange with/Silver Reflective Stripe 15 which features Florescent color for daytime visibility and both stripes are UV stable. Additional trim such as 3M High Gloss Reflective Trim number 6160 White and 6185 Blue can also be utilized. Numbers 6186 Fluorescent Red-Orange and 6187 Fluorescent Lime-Yellow feature shiny glossy appearance and enhanced daytime visibility. Material such as 3M Scotchlite Reflective Material number 8170 Silver Transfer Film featuring high brightness (500 Candelas/Lux/Square Meter Typical) for maximum nighttime visibility can be used with the present invention.

EXAMPLE

By way of example, a safety vest has been fabricated. The vest has proven to be visible from any angle and has proven to be comfortable when worn.

| Component | Patch Description | Material |
|---|---|---|
| Front and rear panels | | 3M High Gloss Blue |
| First patch on front panel and rear panel | Angle Logo secured to Patch | Angel logo - 3M high gloss reflective red-orange trim<br>Background patch - 3M Scotchlite (lime-yellow) |
| Lower patch on the front and rear panel | central area surrounded by a trim | Central area - 3M high glossy Lime-yellow (Scotchlite)<br>Trim - 3M high gloss reflective red-orange |
| Wings | Center patch larger in width, outer trim, thinner in width | Center patch - high gloss red-orange trim<br>outer trim - lime-yellow |
| Arm and waist straps | Center patch larger in width, outer trim, thinner in width | Center patch - high gloss red-orange trim<br>outer trim - lime-yellow |

The vest proved to be visible and comfortable. The use of multiple reflective material provided a product that was not only aesthetically pleasing but was successful in providing exceptional viewing capabilities of the wearer during dark and/or inclement weather. This ultimately rendered visibility of the wearer to others for inherently offering safety to the user. The device was easy to place and adjust. Once on, the vest proved to be comfortable.

While the invention has been particularly shown and described with reference to an embodiment thereof, it will be understood by those skilled in the art that various changes in form and detail may be made without departing from the spirit and scope of the invention.

I claim:

1. A safety garment comprising:

a vest garment including a front panel and a rear panel;

said rear panel includes a patch, centrally located and said patch is fabricated from reflective material; and a mesh material having elastic properties surrounds said patch.

2. A safety garment as in claim 1 wherein said front panel and said rear panel are fabricated from a reflective material.

3. A safety garment as in claim 1 wherein a second reflective patch is located on said front panel.

4. A safety garment as in claim 1 wherein a hood is secured to said rear panel.

5. A safety garment as in claim 1 wherein a hood is removably secured to said rear panel.

6. A safety garment as in claim 5 wherein said hood includes a reflective patch circumferially secured thereon.

7. A safety garment as in claim 1 wherein panels are located on each side of said vest to provide for said panels to protrude out from each of said side and said panels include at least one reflective patch located thereon.

8. A safety garment as in claim 7 wherein said panels are fabricated from a rigid material.

9. A safety garment as in claim 7 wherein arm straps extend from said rear panel to said front panel and said arm straps include at least one reflective patch secured thereon.

10. A safety garment as in claim 1 wherein said front panel and said rear panel include an upper section and a lower section and a second patch made from reflective material is secured to said lower section of said rear panel and a third patch made from reflective material is secured to said front panel on said lower section.

11. A safety garment as in claim 1 wherein sides of front panel and said rear panel are open and straps are secured to said rear panel and include closure device, said front panel includes a closure device which corresponds to said closure device of said straps, and said straps are removable secured to said front panel.

12. A safety garment comprising:

a vest garment including a front panel and a rear panel;

wings protrude outwardly from each side of said front panel and said rear panel;

a patch fabricated from reflective material is secured to each panel and extends from said front panel to said rear panel; and, said rear panel includes a patch centrally located and said patch is fabricated from reflective material and a mesh material having elastic properties surrounds said patch located on said rear panel.

13. A safety garment as in claim 12 wherein said front panel and said rear panel are fabricated from a reflective material.

14. A safety garment as in claim 12 wherein reflective patches are centrally located on said front panel and said rear panel.

15. A safety garment as in claim 12 wherein a hood is secured to said rear panel.

16. A safety garment as in claim 12 wherein a hood is removably secured to said rear panel.

17. A safety garment as in claim 12 wherein said wings are fabricated from a rigid material.

18. A safety garment as in claim 12 wherein straps are secured to said rear panel and include closure device, said front panel includes a closure device which corresponds to said closure device of said straps, and said straps are removable secured to said front panel.

19. A safety garment as in claim 12 wherein arm straps extend from said rear panel to said front panel and said arm straps include at least one reflective patch secured thereon.

* * * * *